United States Patent [19]

Sieber et al.

[11] Patent Number: 5,384,594
[45] Date of Patent: * Jan. 24, 1995

[54] SMART TRACKING SYSTEM

[76] Inventors: Jonathan D. Sieber, 20 Clubhouse La., Wayland, Mass. 01778; Joseph S. Sieber, 31 Granville Rd., Cambridge, Mass. 02138; William K. Stewart, 86 Pine St., Woburn, Mass. 01801

[*] Notice: The portion of the term of this patent subsequent to Jul. 27, 2010 has been disclaimed.

[21] Appl. No.: 89,760
[22] Filed: Jul. 9, 1993

Related U.S. Application Data

[63] Continuation of Ser. No. 825,833, Jan. 27, 1992, Pat. No. 5,231,483, which is a continuation of Ser. No. 577,779, Sep. 5, 1990, abandoned.

[51] Int. Cl.$^6$ .................... H04N 5/225; G01S 15/00
[52] U.S. Cl. ........................... 348/169; 364/516
[58] Field of Search ............... 358/125, 126, 455, 516; 364/516; 348/169

[56] References Cited

U.S. PATENT DOCUMENTS

| | | | |
|---|---|---|---|
| 1,126,095 | 1/1915 | Schiessler | 367/137 |
| 1,138,013 | 5/1915 | Phinney | 367/128 |
| 3,160,850 | 12/1964 | Dudley | 367/117 |
| 3,205,475 | 9/1965 | Foss | 367/117 |
| 3,336,572 | 8/1967 | Paull et al. | 367/117 |
| 3,475,721 | 10/1969 | Cappel, Jr. et al. | 367/124 |
| 3,588,798 | 6/1971 | Papineau | 367/117 |
| 3,715,577 | 2/1973 | Bohman | 367/117 |
| 3,731,273 | 5/1973 | Hunt | 367/13 |
| 3,777,305 | 12/1973 | Stoutmeyer | 367/127 |
| 4,055,830 | 10/1977 | Wilson et al. | 340/16 R |
| 4,064,528 | 12/1977 | Bowerman | 358/125 |
| 4,067,015 | 1/1978 | Mogavero et al. | 343/225 |
| 4,173,008 | 10/1979 | Keith et al. | 367/124 |
| 4,189,747 | 2/1980 | Funari | 358/125 |
| 4,193,073 | 3/1980 | Kohnen | 342/56 |
| 4,239,356 | 12/1980 | Freudenschuss et al. | 354/23 R |
| 4,307,456 | 10/1981 | Ise et al. | 367/108 |
| 4,317,186 | 2/1982 | Nishi et al. | 367/127 |
| 4,409,661 | 10/1983 | Romanski | 364/516 |
| 4,516,226 | 5/1985 | Peynaud et al. | 367/6 |
| 4,574,368 | 3/1986 | Lipschutz | 367/108 |
| 4,597,068 | 6/1986 | Miller | 367/87 |
| 4,601,025 | 7/1986 | Lea | 367/125 |
| 4,601,557 | 7/1986 | Bogle et al. | 352/140 |
| 4,622,657 | 11/1986 | Clare | 340/129 |
| 4,690,549 | 9/1987 | Nakada | 356/4 |
| 4,720,805 | 1/1988 | Vye | 358/229 |
| 4,752,791 | 6/1988 | Allred | 358/229 |
| 4,905,315 | 2/1990 | Solari et al. | 318/640 |
| 5,231,483 | 7/1993 | Sieber et al. | 358/125 |

FOREIGN PATENT DOCUMENTS

| | | |
|---|---|---|
| 59-60377 | 4/1984 | Japan . |
| 62-243480 | 4/1986 | Japan . |
| 62-092687 | 4/1987 | Japan . |
| 2135777A | 9/1984 | United Kingdom . |
| 2181547A | 4/1987 | United Kingdom . |

OTHER PUBLICATIONS

Auto Aligning System for Narrow Beam Acoustic Telemetry, Galloway Nov. 12–14, 1985, IEEE Ocean Engineering Society.
Gerald D. Maslin, A Simple Ultrasonic Ranging System, May 12, 1983.
National Semiconductor Corporation, LM1812 Ultrasonic Transceiver.
Massa Products Corporation, Model TR-89-B Series Types, 23, 31, 40.
Texas Instruments, Sonar Ranging Receiver, Mar. 1988.
Texas Instruments, Sonar Ranging Module, Jan. 1985.
Polaroid, Ultrasonic Ranging System.
C. Biber, S. Ellin, E. Shenk, J. Stempeck, Polaroid Corporation, The Polaroid Ultrasonic Ranging System, Oct. 1980.

Primary Examiner—Ian J. Lobo
Attorney, Agent, or Firm—Wolf, Greenfield & Sacks

[57] ABSTRACT

A smart tracking system includes a digital processor for selectively processing error signals representing the angular error between a tracked subject and the orientation of the tracking device/camera. In one embodiment, the user selects a set of data values representating the operating parameters of the system in a specific operational mode. The processor uses the selected variables to perform a series of computations which selectively modify the angular error signals in a manner that will produce a video picture which is visually and aesthetically pleasing to human viewers. In a second embodiment, the set of data values characterizing the operational mode of the system automatically are selected by the processor based on the past history of the subject's motion and the current operation mode of the system.

25 Claims, 9 Drawing Sheets

SMART TRACKING SYSTEM

RELATED APPLICATIONS

This application is a continuation of application Ser. No. 07/825,833 filed on Jan. 27, 1992, U.S. Pat. No. 5,231,483, which in turn is a continuation of application Ser. No. 07/577,779 filed on Sep. 5, 1990, now abandoned.

This application is co-pending with U.S. patent application Ser. No. 07/396,987, filed Aug. 22, 1989, now, U.S. Pat. No. 4,980,871 and entitled Ultrasonic Tracking System, the subject matter of which is incorporated herein by reference.

FIELD OF THE INVENTION

The present invention relates to measuring and tracking systems and, more particularly, to a system wherein the manner in which a camera tracks a moving subject is dependent upon the context and history of the subject's movements.

BACKGROUND OF THE INVENTION

When an automatic tracking system, such as that disclosed in U.S. Pat. No. 4,980,871, directs a video camera for human viewers, there are a number of aesthetic factors which should be considered. In particular, factors such as the centering of the subject within the camera frame, the smoothness of the camera motion against a stable background, and the continuity of the direction of camera motion are all elements which make a video picture aesthetically pleasing to human viewers. Conversely, a video picture which is characterized by abrupt or continuous camera motion and inconsistent camera tracking speed has a tendency to violate a viewer's visual satisfaction criteria.

A typical automated tracking system utilizes a two step process to eliminate any errors between the position of a tracked subject and the camera direction. First, the tracking system measures the angular error between the tracked subject and the orientation of the tracking device/camera. Next, the error information is used to generate a correction signal to control the motion of the tracking device/camera. The new camera position is then utilized in calculating future angular errors. The resulting tracking is mechanical with a tendency to be just as annoying to the viewer as if the tracking was very inaccurate. For example, constant readjustment of the camera position to every motion of the subject can cause rapid eye fatigue in the viewer.

Additionally, typical automated tracking systems use the same tracking strategy and style for all subjects and contexts, whether the subject is giving a lecture or participating in a fast-paced athletic event. The inability of such tracking systems to be set to, or alternate between, different styles severely limits their applications.

Unlike an automated tracking system, a human cameraman directs a camera to a subject with less than complete accuracy. The cameraman further adjusts the tracking style according to the context in which the subject moves and the immediate past history of the subject's motions. The resulting video contains minor tracking inaccuracies which are visually more pleasing to a human viewer than the exacting and mechanical tracking of an automated system.

Accordingly, it is an object of the present invention to provide a system which allows a camera to track a moving subject in a manner which is visually and aesthetically pleasing to human viewers, by selectively permitting angular errors between the position of the subject and the direction in which the tracking device/camera is pointing.

Another object of the present invention is to provide a system which allows a camera to track a moving subject in a specific style which is appropriate to the context in which the subject is moving.

A further object of the present invention is to provide a system which allows a camera to track a moving subject in a style which is determined by the system, based on the past history of the subject's motions.

SUMMARY OF THE INVENTION

A system for permitting a device to point at and track the movements of a subject comprises a signal source and a control means which receives signals from the source and generates therefrom control signals. A memory means stores plural sets of data values, each of the sets representing the operating parameters of said system in a specific operational mode. Means are provided for selecting one of said plural sets of data values. A processor processes the control signals in accordance with the selected data values and produces processed control signals. A drive unit moves the device about an axis in response to the processed control signals to maintain the device pointed at the subject.

In one embodiment, the means for selecting one of the plural sets of data values comprises a user-defined signal for indicating the desired data value set and its corresponding operational parameters. In a second embodiment, the means for selecting a data value set is a function of the processor which, when processing the control signals, determines whether the selected data value set is appropriate for the moving subject. If not, the processor selects a new data value set and thereby changes the operational mode of the system.

The forgoing and other features, objects and advantages of the invention will be more fully understood by reading the detailed description below, in conjunction with the drawing.

DETAILED DESCRIPTION

The present invention provides a smart tracking system which in an exemplary embodiment, is an active tracking system comprising two units. The first unit is a small, battery-operated, omni-directional ultrasonic transmitter which is carried by the subject to be tracked. The transmitter produces brief, bursts of sound at frequencies above the range of human hearing. The second unit comprises a motorized camera drive capable of tilting and panning an attached camera. It should be understood that the present invention may also be implemented with a passive tracking system, not requiring a transmitter worn by the subject.

In an exemplary embodiment, a battery-operated ultrasonic receiver is attached to the camera drive. The receiver is tuned to the same frequency as the transmitter carried by the subject. The receiver employs three ultrasonic microphones, together with electronic circuitry to detect and amplify the ultrasonic signals generated by the transmitter and intercepted by the microphones. The microphones are located at three of the four corners of an imaginary square centered on and perpendicular to the axis of the camera lens. The signals emanating from the subject will arrive at all three microphones simultaneously only if the camera is pointed directly at the subject. The receiver measures the relative arrival times of signals received by the microphone, determines the direction and degree to which the camera is not pointed directly at the subject, and causes a servo-system to drive motors to re-orient the camera (and receiver) to point toward the subject matter. This re-orientation or tracking is done in a manner that is visually pleasing to human viewers, and is adaptable to a variety of contexts.

Figure 1:
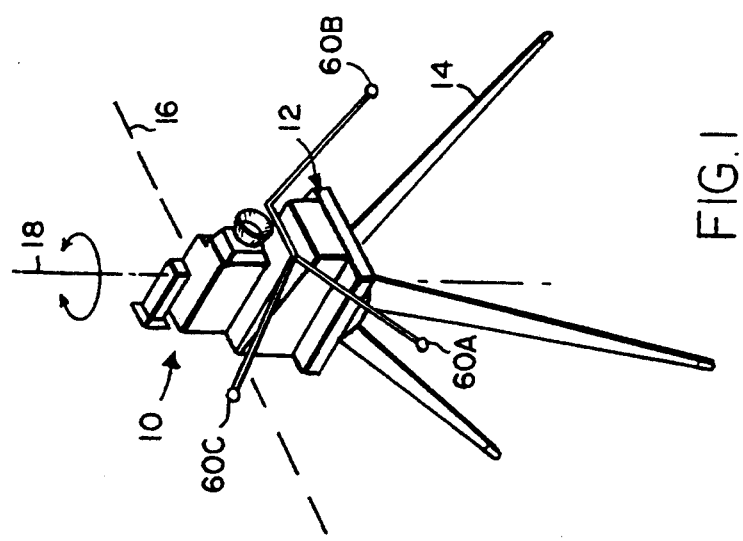
FIG. 1 is a pictorial illustration of the drive unit of a tracking system suitable for use with the present invention.

Referring to FIG. 1, a television or motion-picture camera or other device 10 (hereinafter referred to as a camera, without loss of generality) is attached to a platform or mount which is part of a motorized drive unit, generally designated 12, that is in turn mounted to a tripod 14 or other support. Drive unit 12 can tilt camera 10 up and down about horizontal axis 16 from about 30° below the horizontal to about 30° above the horizontal. The drive unit can also pan the camera left and right about vertical axis 18 through repeated 360° circles. The drive unit responds to ultrasonic signals received via microphones 20A, 20B and 20C to control direct-current motors (not shown) to move the camera mount.

Figure 2:
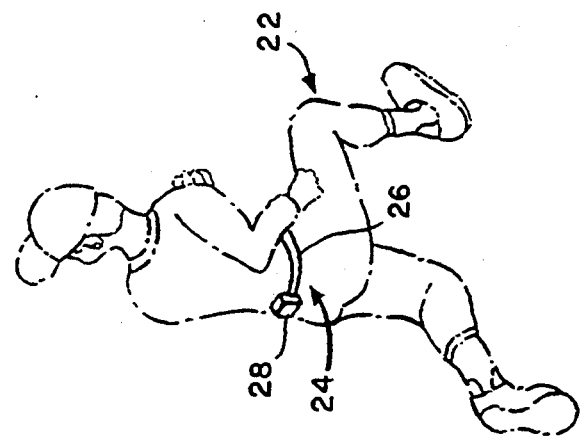
FIG. 2 is a diagrammatic illustration of the subject, such as an athlete, wearing the transmitter unit of a tracking system suitable for use with the present invention.

A subject 22 as shown in FIG. 2, who is to be recorded (e.g., an athlete), is provided with an ultrasonic transmitter 24 to be worn or carried on his or her person. The transmitter unit may include, for example, an elastic belt 26 with buckle for wearing around the waist of the subject. Attached to the belt are three or more transducer units (only one transducer unit 28, being shown in the drawing) connected by flexible cables embedded in belt 26.

Drive unit 12 includes two direct-current motors 2 and 44, respectively. Through conventional mechanisms, motor 42 tilts the camera mount up and down and the motor 44 pans the camera mount left and right. Since the camera is securely fastened to the mount, it undergoes the same motions. The motors are driven by electronic circuitry located on the circuit boards (not shown in FIG. 2) inside the drive unit housing. The circuitry is powered by batteries (also not shown).

Figure 3:
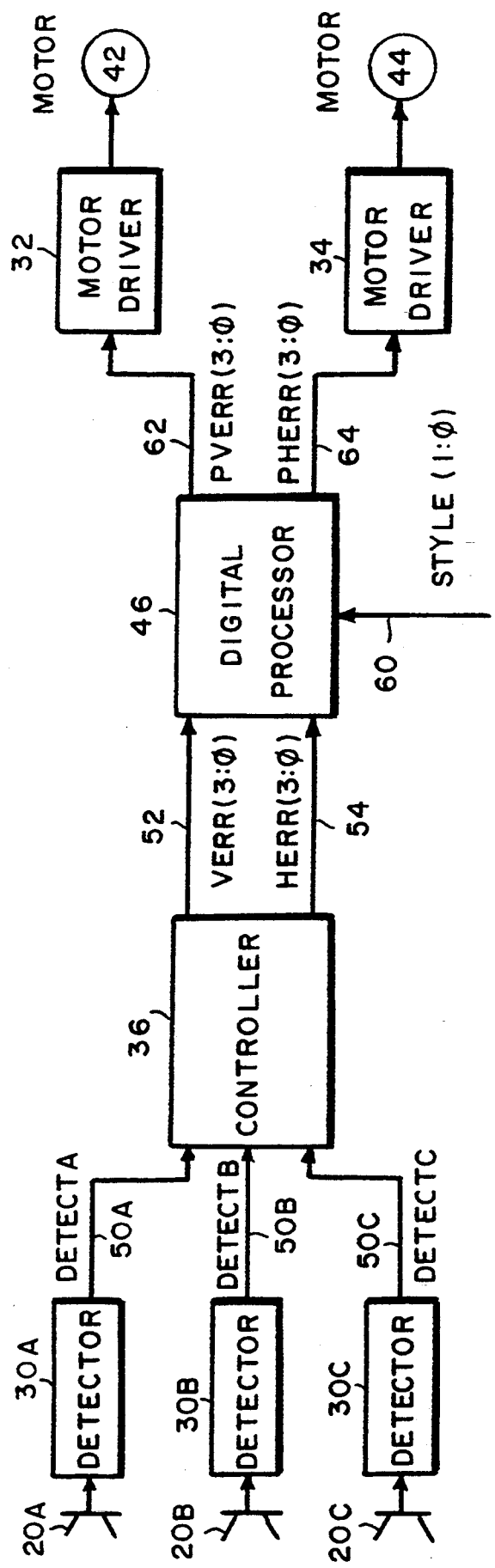
FIG. 3 is a functional block diagram of a drive unit according to the invention.

Three detector circuits 30A, 30B and 30C are shown in the block diagram of FIG. 3, one for each of the three ultrasonic transducers 20A, 20B and 20C, respectively. Also shown are two motor driver circuits 32 and 34, one for each of the two DC motors 42 and 44, respectively. A controller circuit 36 and digital processor 46 operatively connect the detectors to the motor drivers. Each of the transducers 20A, 20B and 20C receive the ultrasonic bursts emitted by the transmitter unit and supplies a corresponding electrical signal to its associated detector circuit. The detector circuit detects the presence of an ultrasonic burst and produces a rectangular pulse whose leading edge coincides with the beginning-of the detected burst. These pulses, 50A, 50B and 50C are routed to controller 36, which measures the delay between the pulses from the three detectors and loads digital error registers (not shown) with binary signals, VERR and HERR. These 4-bit signals represent the angular error along the vertical and horizontal axes, respectively, between the camera direction and the subject. VERR and HERR are updated each time an ultrasonic burst is received.

The structure and function of transmitter unit 24, and drive unit 12, including direct-current motors 42 and 44, and the manner in which the drive unit 12 tracks the location of transmitter unit 24 to keep the camera pointed at the subject, is discussed in detail in U.S. Pat. No. 4,980,871, which is incorporated herein by reference, and will not be repeated for brevity.

Digital processor 46 receives the VERR and HERR signals over busses 52 and 54, respectively. Processor 46, may be a microprocessor. One such microprocessor suitable for use with the present invention is the model MC 68705C8 available from Motorola, Inc., Phoenix, Arizona. Processor 46 manipulates the values of VERR and HERR, in a manner to be described more fully below, according to the particular tracking style desired. The processed error signals, PVERR and PHERR are converted into DC motor drive voltages by identical horizontal (i.e., pan) and vertical (i.e., tilt) motor driver circuits 32 and 34, respectively which drive the tilt and pan motors in the proper direction and at the proper speed to keep the camera pointed at the subject.

Smart Tracking Processes

Figure 4:
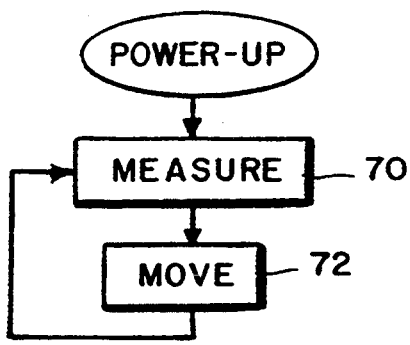
FIG. 4 is a flow chart of the error correction process of prior art automatic tracking systems.

A typical automated tracking system utilizes the elementary two step process illustrated in FIG. 4, to eliminate any errors between position of a tracked subject and the camera direction. First, the tracking system measures the angular error between the tracked subject and the tracking device/camera, as indicated by block 70 in FIG. 4. Next, the error information is used to generate a correction signal to control the motor speed and motion of the tracking device/camera, as indicated by block 72. The new position of the tracking device/camera is then utilized in calculating future angular errors.

In the present invention, a number of signal processing techniques for adjusting the response characteristics of the tracking system give it attributes that result in videos that are pleasing to a human viewer. In a first embodiment, error signals VERR and HERR are manipulated by digital processor 46 in accordance with a 2-bit, user-supplied, STYLE signal, provided via buss 60, which indicates the desired style of tracking.

The STYLE signal selects a set of parameters stored in a digital processor 46 or in a separate semiconductor memory. The parameters comprise a number of data variables which represent acceptable system limitations for the selected style or mode of tracking, as well as variables representing real time data about the position of the tracked subject. The set of system parameters are used by processor 46 to perform a series of calculations to adjust the values of error signals VERR and HERR. The processed signals PVERR and PHERR are supplied over busses 62 and 64, respectively, to control motor drives 32 and 34, respectively, which, in turn, cause camera 10 to point to the subject as closely as possible within the constraints that the resulting motion be pleasing to the eye of the viewer.

In a second embodiment, the user-supplied STYLE signal describing the desired tracking style is replaced with a signal generated by digital processor 46, based on the past history of the tracked subject's motions as described by the most recent values of some of the variables.

Figure 5:
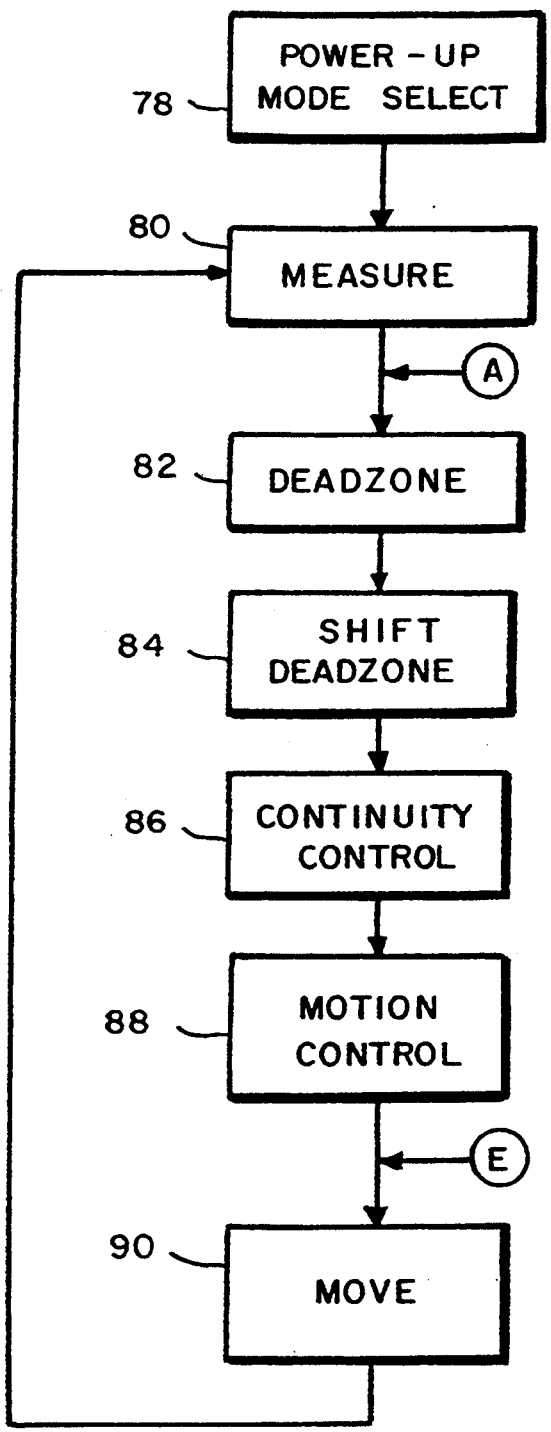
FIG. 5 is a flow chart of the error correction process executed by the drive unit of FIG. 3 according to a first embodiment of the present invention.
Figure 7:
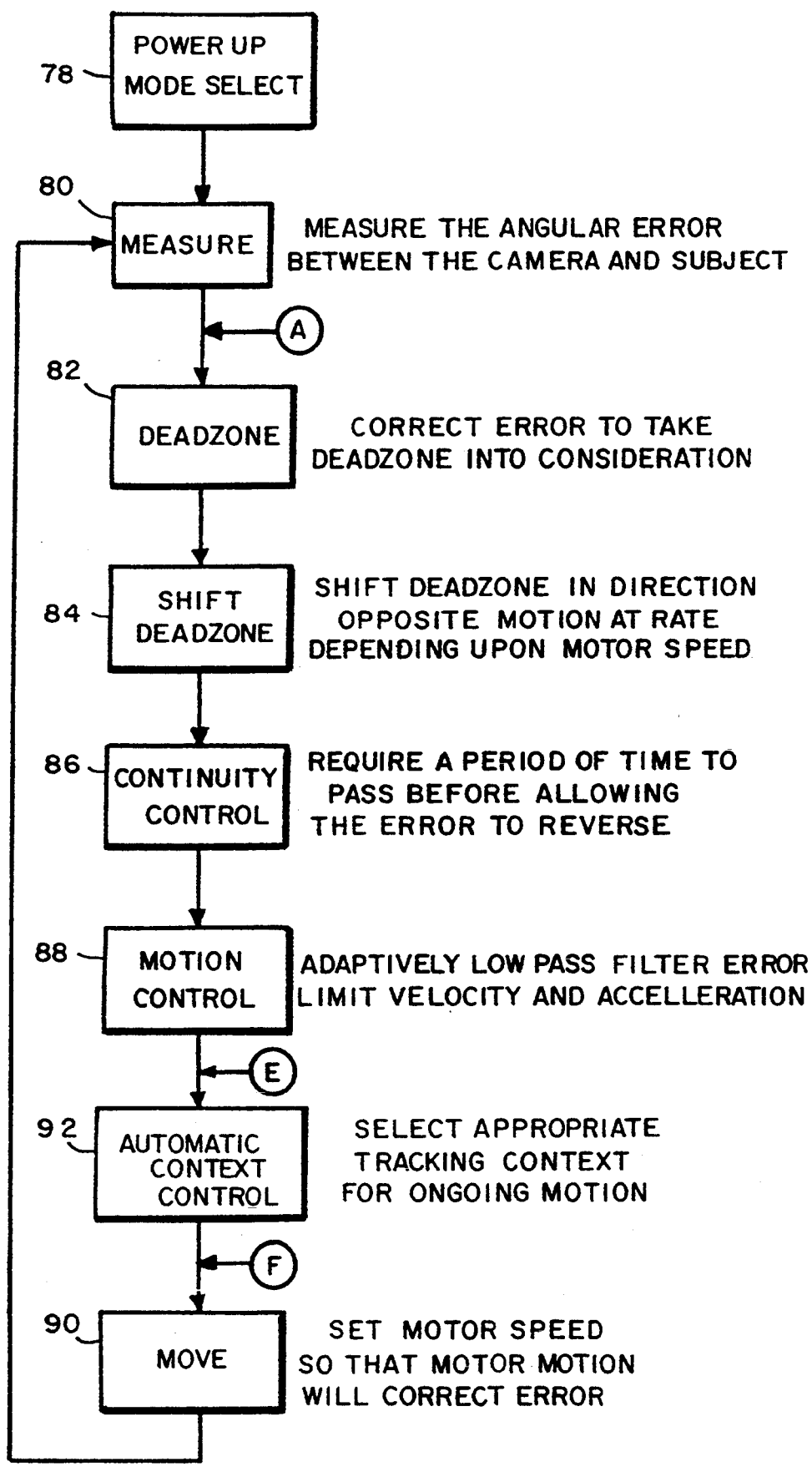
FIG. 7 is a flow chart of the error correction process executed by the drive unit of FIG. 3 according to a second embodiment of the present invention.

FIGS. 5 and 7 illustrate the processes executed, according to the first and second embodiments, respectively, by digital processor 46 to process signals VERR and HERR. The processes adjust the response characteristics of the tracking system to give it attributes that result in videos that are pleasing to a human viewer. Each of these algorithmic processes, represented by blocks 78, 80, 82, 84, 86, 88, 90 and 92, are described in detail below.

In the techniques of the present invention the manipulation of the vertical error signal VERR is essentially identical to that of horizontal error signal HERR. Accordingly, the concepts of the present invention will be explained only in regard to the manipulation of the error signal HERR.

According to a first embodiment of the present invention the user/operator of the tracking system selects the desired style or mode in which to track a subject. This selection is done upon powering the system, as indicated by block 78 of FIG. 5. The user communicates the selected mode to digital processor 46 with the two-bit STYLE signal, supplied over line 60. Optionally, processor 46 may be programmed to select a default set of parameters representing the initial tracking mode or style upon power up. Upon the selection of the desired mode, processor 46 sets all relevant variables to the appropriate values associated with the particular style of tracking selected.

The process of measuring the horizontal and vertical angular errors between the position of the tracked subject and the direction in which the tracking device/camera is pointing, as represented by block 80 of FIG. 5, is described above and entails those functions to the point where error signals VERR and HERR are presented to digital processor 46. Likewise, the conversion of 4-bit offset binary signals and into DC voltages to control motors 42 and 44, respectively, as represented by block 90 of FIG. 5, is described in detail in U.S. patent application Ser. No. 07/396,987, now allowed, and will not be described further. The algorithmic steps represented by blocks 82, 84, 86 and 88 are performed by digital processor 46 in conjunction with the STYLE signal and are described in detail below.

Deadzone Controller

Figure 6A:
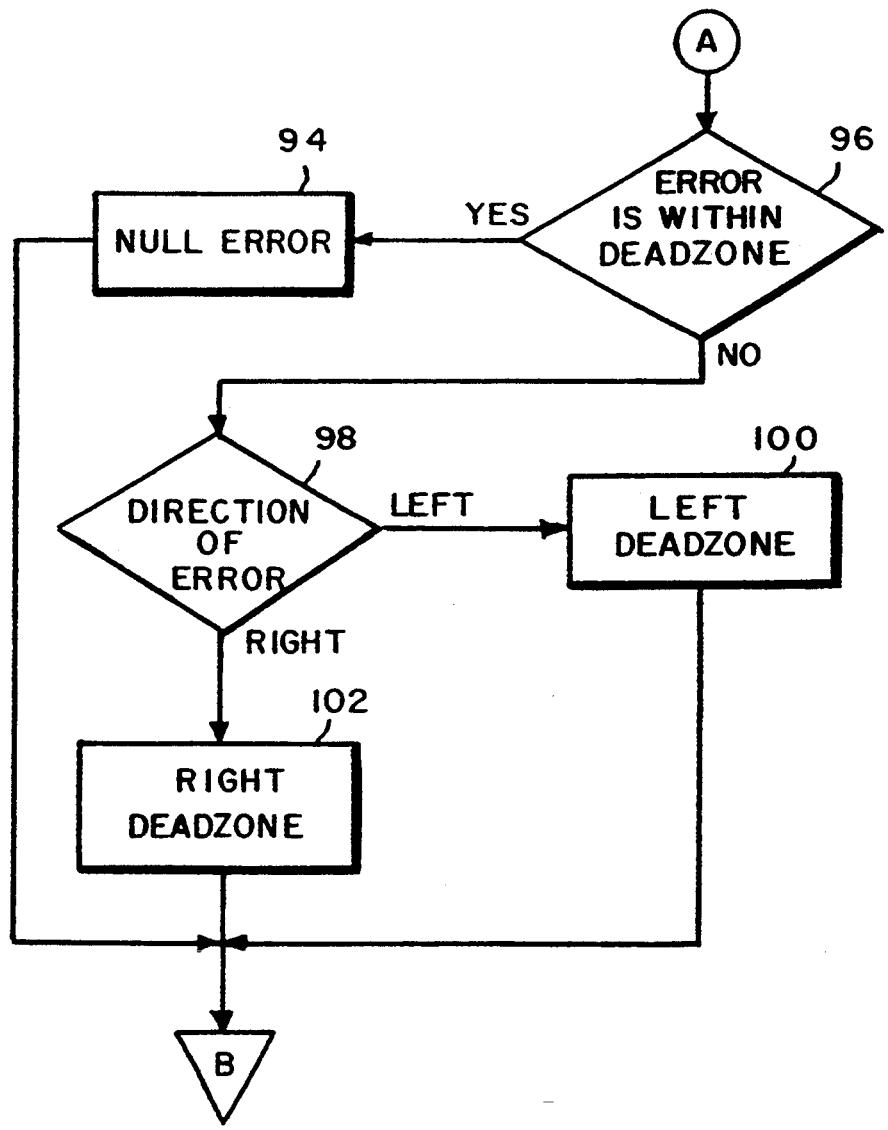
FIG. 6A is a flow chart of the algorithmic steps for calculating the dead zone of the process of FIG. 5.

A first process as executed by digital processor 46 to produce a tracking style which is more pleasing to human viewers includes a deadzone controller, represented by process block 82 in FIG. 5 and implemented with the algorithmic steps illustrated in FIG. 6A. Unlike existing tracking systems where the desire to keep the subject centered at all times within the camera frame takes precedence over other esthetic goals, the present invention allows the subject to move anywhere within a central portion of the camera frame referred to as the "deadzone", without adjusting the camera position.

The deadzone controller is implemented with a number of variables, stored in digital processor 46, which represent various system parameters. The value of these parameters varies according to the desired tracking style specified by the user. Processor 46 manipulates the variables to achieve the desired controller function.

The deadzone is described by a pair of angular values (DEAD LEFT, DEAD RIGHT) that correspond to the range of angular error that is tolerated in each direction before the camera position is readjusted. Initially, the deadzone is symmetric about the center of the subject and is set to (−THETA, +THETA), where the variable THETA is an angular value and is a parameter of the tracking context. The total angular range of the deadzone is equal to twice the value of THETA.

The ERROR variable represents the value of the angular ERROR along one axis between the tracked subject and the direction of the tracking device/camera. The deadzone controller takes the value of the ERROR variable and remaps the variable into a new ERROR variable which accounts for the deadzone. For the purposes of this exemplary embodiment, the ERROR variable will represent the angular error on the horizontal axis HERR, however it could equivalently represent the angular error along the vertical axis, VERR.

Referring to FIG. 6A, the deadzone is represented by the values (DEAD LEFT, DEAD RIGHT). Digital processor 46 then determines whether the value of ERROR is still within the deadzone, as indicated by decisional step 96. If the value of the ERROR variable is within the deadzone, the ERROR variable is set to zero, as indicated by processing step 94. When the value of ERROR variable is not within the deadzone, the subject has moved out of either side of the deadzone.

Once it is determined that the value of ERROR is not within the deadzone, as determined by step 96, the direction of the ERROR is determined, as indicated by decisional step 98. If the value of ERROR is to the left of the deadzone, the value of DEAD LEFT is subtracted from the value of ERROR, as indicated by processing step 100. Conversely, if the value of ERROR is to the right of the deadzone, the value of DEAD RIGHT is subtracted from the value of ERROR, as indicated by processing step 102. In this manner, as the subject moves out of either side of the deadzone the angular error is transformed by subtracting the edge of the deadzone so that it describes how far in degrees from the edge of the deadzone the subject is rather than how far from the center of the camera frame.

Ultimately, the deadzone may be implemented as a zone of reduced response. In this implementation the response to the system, i.e. the relation between ERROR and MOTOR SPEED, in the reduced response zone can be set to a very low gain rather than a gain of zero. This implementation allows the system to slowly recenter the camera on the tracked subject instead of not moving at all as in the case with the deadzone implementation. However, such an implementation requires very close control over the motors 42 and 44 at low speeds, making the implementation practical only with precision stepping motors and not typical analog motor controllers. In addition, such an implementation complicates the processing performed by the directional continuity controller and motion controller, as explained hereinafter.

Deadzone Shift Controller

Figure 6B:
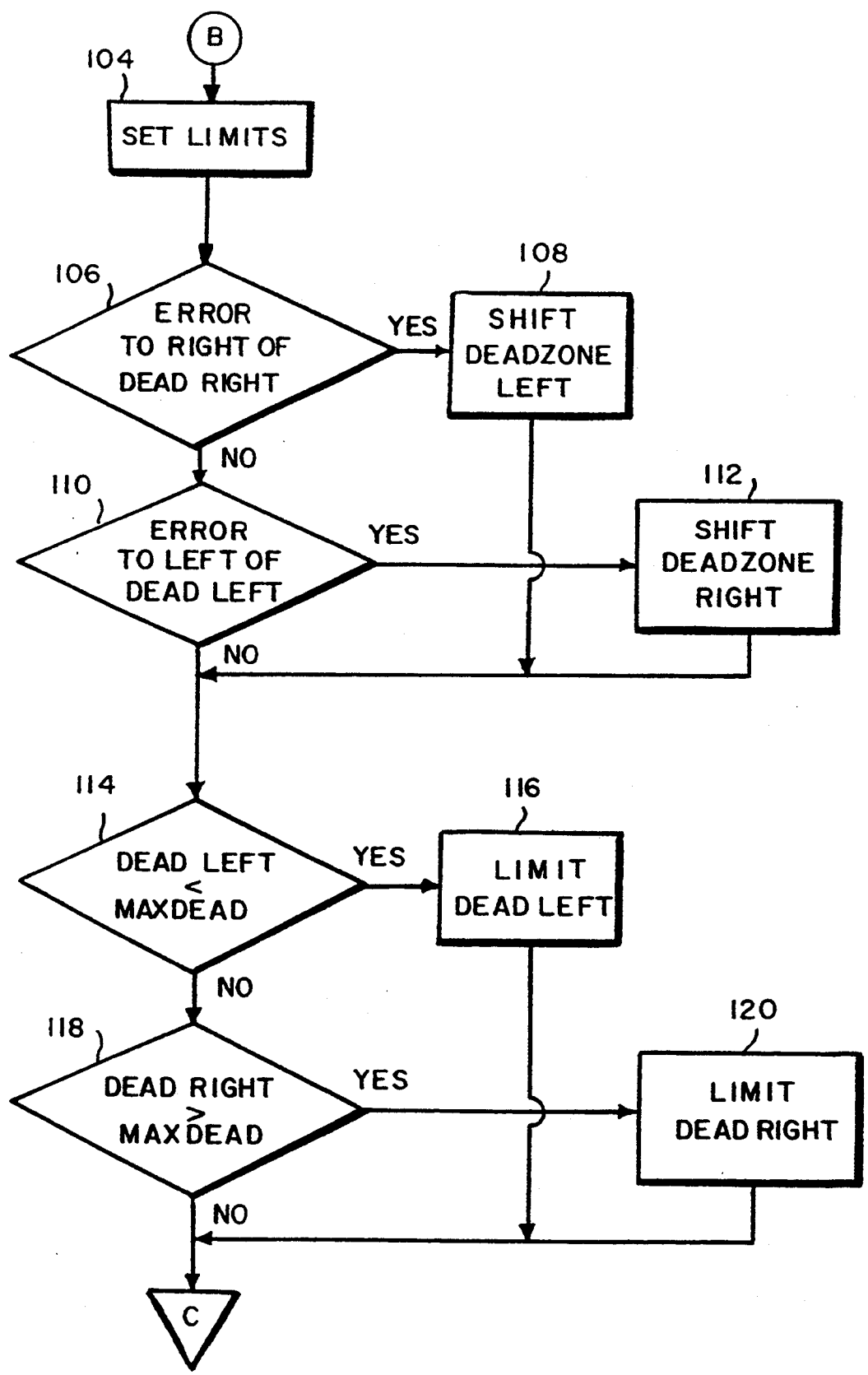
FIG. 6B is a flow chart of the algorithmic steps for shifting the dead zone of the process of FIG. 5.

A second process executed by digital processor 46 comprises a deadzone shift controller, represented by block 84 in FIG. 5 and implemented by the algorithmic steps illustrated in FIG. 6B. As a subject moves out of the deadzone and the camera begins to track the subject, the deadzone shifts. The purpose of the deadzone shift is to allow the camera to catch-up with the moving subject rather than always lagging by THETA.

Before the deadzone can be shifted, a number of limits are initialized. The variable MAXDEAD represents the value of THETA plus the maximum number of degrees that one edge of the deadzone may be shifted toward the center of the camera frame. The MAXDEAD value is a function of motor speed. The motor speed for which MAXDEAD is greater than THETA, its minimum value, is the point at which the deadzone is allowed to shift. The motor speed for which MAXDEAD is equal to (2•THETA) is the point at which the deadzone has shifted sufficiently for the tracking system to begin leading the subject.

The variable DEADSHIFT represents the maximum rate in degrees per second that the deadzone may be shifted, and is likewise a function of the motor speed. The value of DEADSHIFT is typically some small fraction of the motor speed.

Before shifting the deadzone, the values of the variables of MAXDEAD and DEADSHIFT are set to a function of the value of MOTOR SPEED, which represents the current value of the speed of the motor 44, as indicated by processing step 104.

The shift of the deadzone occurs in the following manner. The value of ERROR is compared to the right edge of the deadzone, DEAD RIGHT, as indicated by decisional step 106. If the value of ERROR is beyond the right edge of the deadzone, the deadzone is shifted left, as indicated by processing step 108. This leftward shifting is accomplished by subtracting the value of DEADSHIFT from both the value of DEAD LEFT and the value of DEAD RIGHT. If the value of ERROR is not beyond the right edge of the deadzone, a comparison is made to determine whether the ERROR value is beyond the left edge of the deadzone, as indicated by decisional step 110. If the value of ERROR is beyond the left edge of the deadzone, the deadzone is shifted to the right, as indicated by processing step 112. This rightward shifting of the deadzone is accomplished by adding the value of DEADSHIFT to both the value of DEAD RIGHT and the value of DEAD LEFT.

The new values of DEAD LEFT and DEAD RIGHT now represent the shifted deadzone which is then compared to the value MAXDEAD to determine if the deadzone has been shifted beyond the allowable limit of MAXDEAD. To accomplish this, the value of DEAD LEFT is compared to the value of −MAXDEAD, as indicated by decisional step 114. If the left edge of the deadzone is beyond the allowable limit, i.e. DEAD LEFT<−MAXDEAD, the deadzone is shifted to the left limit. This is accomplished by setting DEAD LEFT to −MAXDEAD and setting DEAD RIGHT equal to (2•THETA−MAXDEAD), as indicated by processing step 116.

If the left edge of the deadzone is within the allowable limit, the right edge of the deadzone, DEAD RIGHT, is compared to the value of MAXDEAD, as indicated by the decisional step 118. If the right edge of the deadzone is beyond the allowable limit, the deadzone is shifted to the right limit by setting DEAD RIGHT equal to MAXDEAD and setting DEAD LEFT equal to (MAXDEAD−2•THETA), as indicated by processing step 120.

To exemplify the above process, assume that the subject moves out of the right side of the deadzone and the camera begins to track the subject. Since the camera is in motion the value of MAXDEAD will be greater that THETA, its minimal centered value, allowing the deadzone to shift in the direction opposite to the direction of the camera's motion. If THETA is given a value of 5°, the initial deadzone is (−5, +5) degrees. With a current motor speed of 25° per second, typical values could be 9° for the maximum allowable deadzone value, MAXDEAD, and 1° per second for the maximum rate of deadzone shift, DEADSHIFT. Over a period of 4 seconds, the deadzone will shift from (−5, +5) to (−9, +1). At this point, the camera will be trailing the subject by 1° rather than the 5° that would result if the deadzone had not been shifted.

As the camera moves at a faster speed the limit of the deadzone, MAXDEAD, will eventually shift to greater than 10° and the deadzone will begin to shift to (<−10, <0), with the effect of leading the tracked subject. As the subject slows down, the maximum deadzone, MAXDEAD, will decrease again to 5°, and the deadzone will begin to shift back towards its normal rest value of (−5, +5) which corresponds to its normal centered position, allowing the subject to move within the symmetric deadzone in the camera frame.

The size of the deadzone, (2•THETA); the function controlling the rate at which the deadzone is shifted, DEADSHIFT; and the function controlling the amount the moving subject is led by the camera, MAXDEAD, are all parameters that may be adjusted depending upon the tracking strategy, as specified by the user. Note that the choice of the DEADSHIFT function effects the overall stability of the control servoloop of the system and should be chosen to avoid instability, as can be appreciated by one skilled in the art.

Continuity Control

Figure 6C:
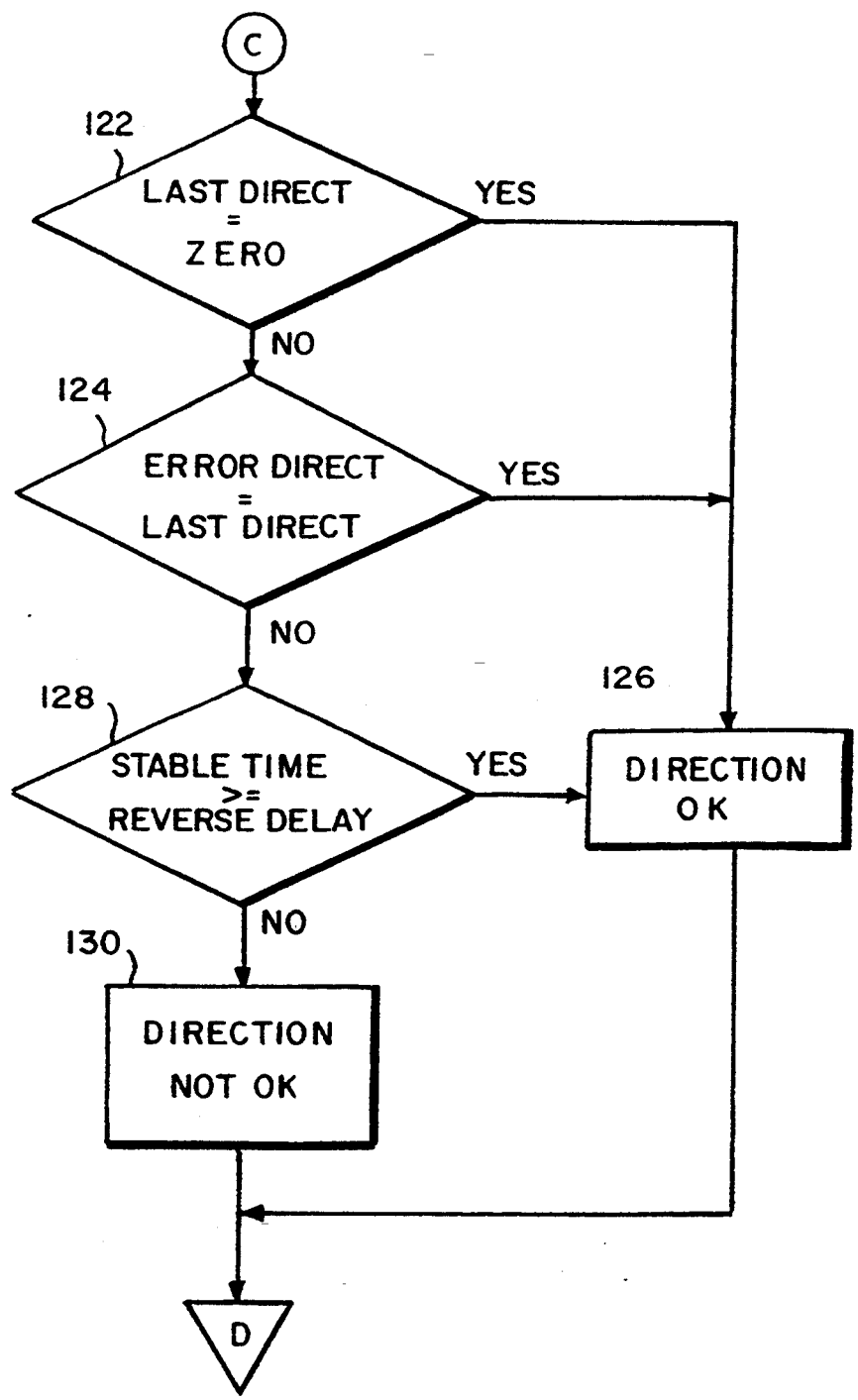
FIG. 6C is a flow chart of the algorithmic steps for continuity control of the process of FIG. 5.

A third process executed by digital processor 46 to produce a tracking style which is more pleasing to human viewers includes a directional continuity controller, represented by process block 86 in FIG. 5 and implemented by the algorithmic steps illustrated in FIG. 6C. Human viewers are very sensitive to changes in the direction of the motion of an image. Accordingly, it is important to minimize the number of times the direction of camera motion changes. Viewers are particularly sensitive to directional changes that occur either at low speeds or when the tracking device/camera moves from high speed motion to a stop and reverses direction. The directional continuity controller guarantees that there is not a series of directional changes that would be annoying to the viewer. Like the dead zone and dead zone shift controllers, the directional continuity controller is implemented with a number of variables, stored in digital processor 46 and representing various system parameters. The values of these parameters vary according to the desired tracking modes specified by the user. Processor 46 manipulates the variables to achieve the desired controller function.

The variables relevant to the directional continuity controller are as follows. The LAST DIRECT variable represents, the sign of the direction in which the camera was last moving. The ERROR DIRECT represents, the sign of the angular error between the camera direction and the subjects position, i.e., the direction the camera must move to close-in on the subject. The STABLE TIME variable represents, in seconds, the elapsed time since the last motion of the camera. The REVERSE DELAY variable represents the minimum time that the subject is required to move in a new direction before the camera will begin to move. Until the time specified by the REVERSE DELAY variable is met the camera is not allowed to change direction. Note that some portion of the REVERSE DELAY time will be spent as the subject crosses the dead zone of the camera frame.

The algorithmic steps executed by the directional continuity controller are illustrated in FIG. 6C. At any point in time, the LAST DIRECT and STABLE TIME variables represent the last direction of camera motion and the elapsed time since such motion, respectively. If other control processes try to move the camera in the same direction, such motion is allowed and the elapsed time is reset. To accomplish this, processor 46 compares the value of the LAST DIRECT variable to zero, as indicated by decisional step 122. If the value of LAST DIRECT equals zero, indicating that the camera has not recently been in motion, the camera is allowed to move in the direction of the error, as indicated by processing step 126. During step 126 the value of the STABLE TIME variable is set to zero and the value of the LAST DIRECT variable is set to the value of the ERROR DIRECT variable.

If in decisional step 122, the LAST DIRECT variable is not equal to zero, indicating that the camera has recently been in motion, the value of the ERROR DIRECT variable is compared to the LAST DIRECT variable, as indicated by decisional step 126. If the ERROR DIRECT variable equals the LAST DIRECT variable, indicating that the error direction and the last camera direction are the same, processing step 126 is executed as previously described.

If the error direction and the last camera direction are not equal, the elapsed time since the last motion, STABLE TIME, is compared to the REVERSE DELAY constant, as indicated by procedural step 128. If the value of the STABLE TIME variable is greater than or equal to the REVERSE DELAY value, then processing step 126 is executed as previously described. If however, the elapsed time since the last motion is less than the time specified in the REVERSE DELAY variable the camera is not allowed to reverse directions, as indicated by processing step 130. In processing step 130 the value of the STABLE TIME is incremented and the ERROR variable is set to zero. The value of the LAST DIRECT variable remains unchanged.

In this manner, the directional continuity controller allows the camera to move in the direction of its most recent motion. However, a minimum threshhold of time is required before the camera is allowed to reverse directions. The value of the time delay specified in the REVERSE DELAY variable is a parameter of the tracking context, as indicated by the user-specified STYLE signal. Typical ranges for the value of the REVERSE DELAY variable can be from 1/6 of a second to greater than 5 seconds, without causing instability in the servo loop of the tracking system.

Motion Controller

Figure 6D:
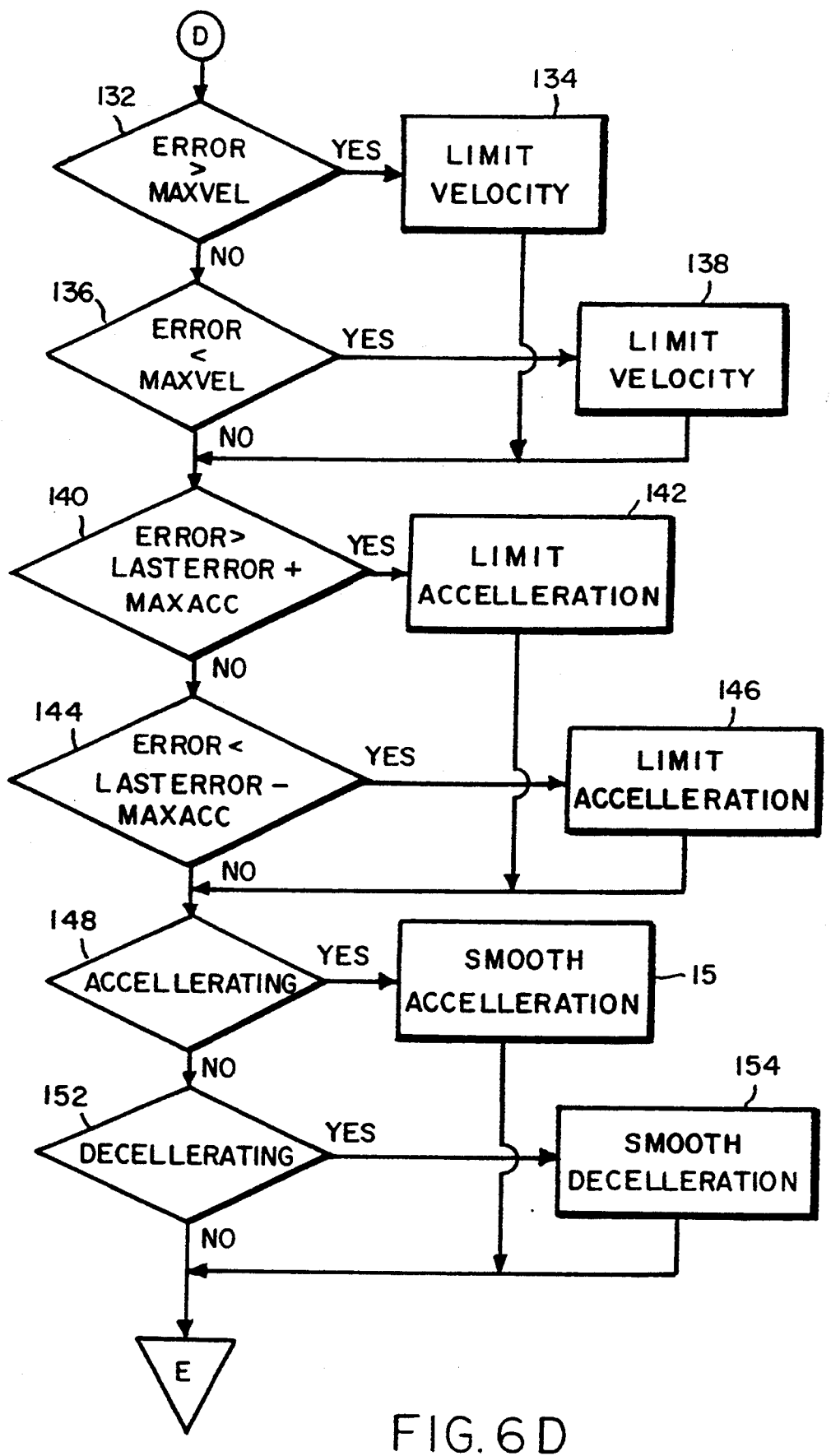
FIG. 6D is a flow chart of the algorithmic steps for motion control of the process of FIG. 5.

A fourth process executed by digital processor 46 includes a motion controller, represented by process block 88 in FIG. 5 and implemented by the algorithmic steps illustrated in FIG. 6D.

In most video pictures, the background typically represents a greater portion of the picture than does the subject. If the motion of the scene against the background is jerky, the picture will be disconserting to the viewer, even if this results from tracking the inconsistent motions of the subject. The motion controller performs a pseudo filtering function in the response of the system by selecting acceleration time constants that are different from the deceleration time constants for the motors driving the camera. As a result, the camera motion starts smoothly while avoiding any tendency to overshoot the subject when the motion is halted. In addition to the filtering function, the motion controller places limits on the maximum velocity and acceleration of the camera depending on the context of the subject's motion. As with the other process controllers, the motion controller is implemented with a number of variables, stored in digital processor 46 and representing various system parameters. The value of these parameters varies according to the desired tracking modes selected by the user.

The variables relevant to the motion controller are as follows. The variable ERROR is defined as similar to that used by the dead zone controller. The variable LASTERROR represents the previous value of ERROR. The variable MAXACC represents the maximum allowable acceleration, measured in degrees per second squared, for the selected tracking mode. The variable MAXVEL represents the maximum allowable velocity, measure in degree per second, for the selected tracking mode. The variable K ACC represents the exponential smoothing time constant that controls the rate of which the motor 44 is accelerated. The value $(1-K\ ACC)$ is the fraction of the exponentially averaged history of the signal that is left after one time step. The variable K DEACC represents the exponential smoothing time constant that controls the speed at which motor 44 is decelerated. The value $(1-K\ DEACC)$ is the fraction of the exponentially averaged history of the signal that is left after one time step. Typically the variable K DEACC is greater than or equal to the variable K ACC to make the acceleration as smooth as possible while avoiding overshooting of the subject when the camera motion stops. The values of both K ACC and K DEACC are in the range between zero and one.

The motion controller operates as follows. If the value of ERROR would lead to a camera velocity that is greater than the maximum allowable velocity prescribed by the tracking mode, the velocity is limited. This is accomplished by comparing the value of ERROR to the value of MAXVEL, as indicated by decisional step 132. If the value of ERROR is greater than value of MAXVEL, the velocity is limited by setting ERROR equal to the value of MAXVEL, as indicated by procedural step 134. If the value of ERROR is not greater than MAXVEL in step 132 it is compared to the value of −MAXVEL, as indicated by decisional step 136. If the value of error is less than −MAXVEL, the velocity is again limited by setting ERROR equal to −MAXVEL, as indicated by process step 138.

If the difference between the current value of ERROR and the previous value of ERROR, LAST ERROR (which is the acceleration) is greater than the maximum acceleration prescribed by the tracking context, the camera velocity is limited to the current camera velocity plus the maximum acceleration. To accomplish this, the value of ERROR is compared to the sum of the LAST ERROR and MAXACC, as indicated by decisional step 140. If the value of ERROR is greater in step 140, the acceleration is limited by setting the value of ERROR to the sum of LAST ERROR and MAXACC, as indicated by process step 142. Otherwise, the value of ERROR is compared to the current velocity minus the maximum allowable acceleration, as indicated by decisional step 144. If the value of ERROR is less than the value of LAST ERROR minus MAXACC, the acceleration is again limited by setting the value of ERROR to LAST ERROR minus MAXACC, as indicated by processing step 146.

After any acceleration or velocity limiting, digital processor 46 determines whether the camera is accelerating, as indicated by decisional step 48. If the camera is accelerating, a smoother acceleration is achieved as indicated by process step 150. A smooth acceleration is achieved by computing a smooth error value, NSERROR using the value of ERROR and the value of the last smoothed error, LSERROR, with Eq. (1) below.

$$NSERROR = (1 - K\ ACC) \bullet LSERROR + K\ ACC \bullet ERROR \quad (1)$$

Process step 150 is the equivalent of low pass filtering. The new smooth error, NSERROR, of Eq. (1) is then used to control the speed of motor 44.

If the camera is not accelerating, processor 46 determines if the camera is decelerating, as indicated by decisional step 152. If the camera is decelerating, a smooth deceleration is performed as indicated by the processing step 154. The smooth deceleration is achieved by computing a smooth error value, NSERROR using the value of ERROR and the value of the last smoothed error, LSERROR with Eq. (2) below.

$$NSERROR = (1 - K\ DEACC) \bullet LSERROR + K\ DEACC \bullet ERROR \quad (2)$$

The above pseudo low pass filtering technique uses different time constants when accelerating and decelarating. The sensitivity of viewers to the smoothness of acceleration is greater than the sensitivity to the smoothness of deceleration. In a preferred embodiment the ratio between K ACC and K DEACC is typically 1:2.

In the first embodiment of the present invention the user of the tracking system specifies a tracking context so that the system performance is specifically tuned for the context of the subject's motion. A typical selection of modes or tracking styles may include slow, general and fast action modes. A slow action mode, good for lectures, walking sports, playing with young children or any activity without running, is be characterized by slow, smooth motion with a tendency to lag the subject if the subject engages in a quick motion. A general action mode, good for general play is appropriate for smooth motion with a tendency to lag the subject only when the subject is at a full run. A fast action mode, good for tennis, basketball, soccer or any activity with full speed running and quick changes of motion would be appropriate for quickly tracking even the fastest moving subject and has a tendency to react more quickly than is visually pleasing if the action isn't fast enough to mask Automatic Contexts Determination Controller According to the second embodiment of the present invention, the user-supplied STYLE signal, describing the desired tracking style, is replaced with a signal generated by digital processor 46, based on the past history of the tracked subject's motion as described by the most recent values for some of the system variables, as explained hereinafter.

FIG. 7 illustrates processes executed by digital processor 46 to process signals VERR and HERR. In this embodiment, processor 46 automatically adjusts the previously described processes so that the response characteristics of the tracking system give it attributes that result in videos that are pleasing to the human viewer. Referring to FIG. 7, the algorithmic process represented by blocks 78, 80, 82, 84, 86, 88, and 90 are similar to those described with reference to FIG. 5 and the first embodiment of the present invention.

Figure 8:
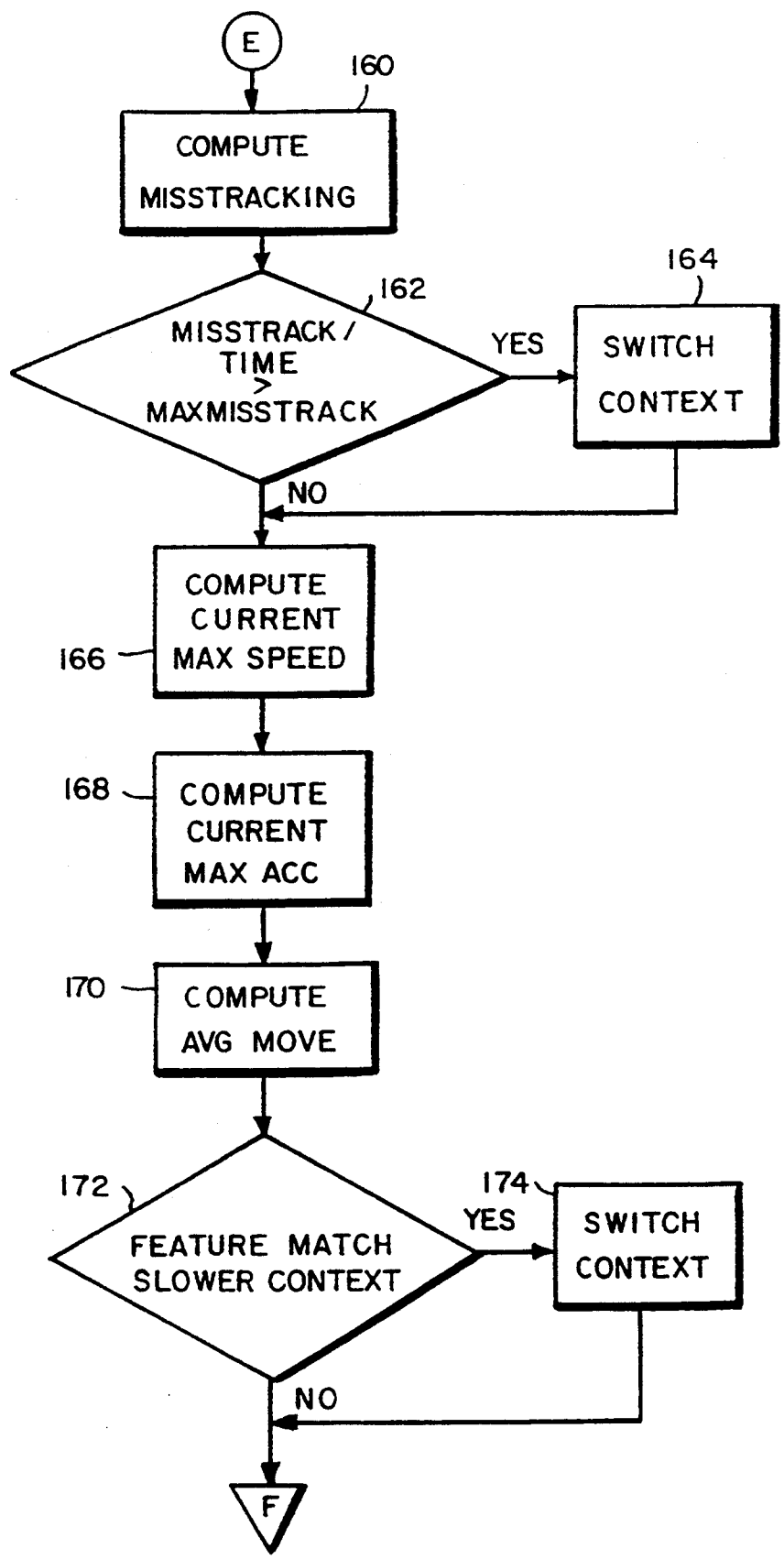
FIG. 8 is a flow chart of the algorithmic steps for automatic context determination of the process of FIG. 7.

A fifth process executed by digital processor 46 includes an automatic context controller, represented by process block 92 in FIG. 7 and implemented by the algorithmic steps illustrated in FIG. 8.

Since a part of the function of the tracking system is to determine the position of the subject being tracked, there is a significant amount of information available that can be used to predict the style of future motions. Typically, the real activities that the subject engages in are quite stable in their range of motions. In the second embodiment of the present invention the parameters of the subject's motion are stored and then compared with the parameters expected to be associated with such a tracking context. The extracted parameters include: the spectral characteristics of the motion, the percentage of time the current context tracks properly, the maximum angular acceleration of the subject, and the minimum angular speed of the subject. These parameters are chosen more for ease of calculation than as being the best parameter.

The variables relevant to the automatic context determination controller are as follows. The CONTEXT variable is the equivalent to the STYLE signal and designates the currently selected tracking context or mode. The MISSTRACKING variable represents the length of time the subject is outside of the dead zone. The MAXMISSTRACK variable represents the maximum allowable percentage of time the subject may be allowed outside the dead zone for the particular tracking style selected by the CONTEXT variable. The AVG MOVE variable represents the average time the subject moved in a single direction. The MOTOR SPEED variable is the same as previously defined regarding the first embodiment. The DELTA ERROR variable represents the change in angular error, in degrees, since the angular error of the subject was last measured. DELTA ERROR is added to the MOTOR SPEED to give the speed of the subject, CURRENT SPEED. The DELTA SPEED variable represents the change in CURRENT SPEED, in degrees per second, since the angular error of the subject was last measured. The MAX SPEED variable represents the maximum angular speed of the subject. The MAX ACC variable represents the maximum angular acceleration of the subject.

Following processing by motion controller 88, the automatic context determination controller 92 determines whether the current tracking context is appropriate for the motion of the subject. Referring to FIG. 8, with each new value of ERROR, the amount of time in which the current system mode mistracked the subject is computed, as indicated in processing step 160. The absolute value of the ERROR variable is used to determine whether the subject is currently being mistracked. If the absolute value of the ERROR variable is less than or equal to a maximum allowable error, the value of MISSTRACKING is not incremented, indicating that the subject is still moving within the acceptable zone. However, if the absolute value of the ERROR variable is greater than the maximum allowable angular error, the value of MISSTRACKING is incremented, indicating that the subject has left the acceptable zone.

The percentage of the time the system is mistracking is calculated by dividing MISSTRACKING by the total time, and compared to the maximum allowable percentage for the current mode, MAXMISSTRACK, as indicated in decisional step 162. If the percent of time the system is mistracking the value of MISSTRACK is greater than the value of MAXMISSTRACK, the value of the CONTEXT variable is set to the next faster context or tracking mode, as indicated by processing step 164. Next the maximum angular speed of the subject, MAX SPEED, is calculated as indicated by processing step 166. This is done by setting the value of MAX SPEED to the maximum of the last value of MAX SPEED and the absolute value of the current speed of the subject, CURRENT SPEED, which is computed as in Eq. (3) below.

$$CURRENT\ SPEED = (MOTOR\ SPEED + DELTA\ ERROR) \quad (3)$$

The absolute value of the speed of the subject is used so the value of MAX SPEED will be direction independent.

Next, the maximum angular acceleration of the subject, MAX ACC, is calculated as indicated by processing block 168. This is done by setting the value of MAX ACC to the maximum of the last value of MAX ACC and the absolute value of the current acceleration of the subject, CURRENT ACC, which is computed as in Eq. 4 below:

$$CURRENT\ ACC = DELTA\ SPEED \quad (4)$$

The absolute value of the difference in speed of the subject is used so the value of MAX ACC will be direction independent.

Finally, the average time of the subject's movement is computed as indicated by processing step 170. The average time is calculated by simply computing the average time between directional changes and setting the AVG MOVE variable to such average.

Associated with each available context or mode is a range of values that correspond to appropriate ranges of motion of the subject. A determination is made whether the current values characterizing the subject's motion more closely match those of a slower context, as indicated by decisional step 172. If the characteristics of the subject's motion will closely match a slower mode or context, the value of CONTEXT is set to the next slower context, as indicated by processing step 174. Otherwise, the tracking context remains the same.

Variable Ranges

Depending on the actual physical implementation of the tracking system, various other variables may be relevant. For instance, a GAIN variable may be necessary for controlling the overall gain of the servo-loop in the tracking system. A MOTOR OFFSET value would allow the system to account for the minimum start up voltages required when utilizing analog motors. By adding a MOTOR OFFSET to the ERROR value during the motor control process the zero-crossing response of such a motor can be evened out. Setting the MOTOR OFFSET variable to zero has the effect of adding to the dead zone in a way which is difficult to compensate for with other variables in the system. Since the entire tracking system disclosed in either embodiment of the present invention forms a single servo system, it is difficult to give actual values for the variables contained in each different mode parameter set. Such parameter values are heavily dependent on the specific considerations of the entire electro-mechanical system. However, below are listed a number of ratios which represent a reasonable range of values for select variables between a slow action tracking mode and a fast action tracking mode. The overall gain of the tracking system, i.e., the response of MOTOR SPEED to ERROR, may range over a factor of 4:1. The ratio of K ACC to K DEACC may range over a factor of 1:3. The values of K ACC and K DEACC may each range over a factor of 3:1. The REVERSE DELAY time may range from 1/6 second to 6 seconds. Finally, the value of THETA may range over a factor of 5:1.

Alternate Embodiments

Although the present invention has been described with reference to a sampled, ultrasonic tracking system which uses DC motors, it will be obvious to one skilled in the art that the present invention is equally applicable to any tracking system.

Such systems may be active, as in the exemplary embodiments, or may be passive tracking systems, such as infrared tracking systems which do not require a transmitter to track a subject. Other such tracking systems include systems which use frame to frame motion comparison and pattern recognition techniques to identify portions of an image that are to be maintained within the camera frame. Still other systems may be sampled, as in the exemplary embodiments, or may be continuous, and may use infrared, radio frequency, or sonic transmission to communicate between the transmitter/receiver. Other systems may use precision stepping motors to control the camera or tracking device instead of analog motor controllers.

In the above exemplary embodiments, the algorithmic processes represented by blocks 78, 80, 82, 84, 86, 88, 90 and 92 are implemented with a plurality of system variables and a programmed digital processer. It will be obvious to those reasonably skilled in the art that functionally equivalent processes may be achieved with an implementation using small, medium or large scale logic components as well as analog circuit elements. Such hardware implementations are well within the scope of those reasonably skilled in the art and are within the scope and spirit of the present invention.

The above invention has been described with reference to the horizontal angular error signal, HERR, which represents one axis of a multiple axis system. It is obvious to those skilled in the art how the control functions disclosed herein are equally applicable to the vertical angular error signal, VERR, provided the designer accounts for the differing sensitivity of the human eye to vertical axis motion. It will be further obvious to those reasonably skilled in the art that digital processor 46 may perform the control functions for both the horizontal and the vertical angular error signals, as shown in FIG. 3, or that two such digital processors may be used, one for each axis of motion.

Further, since many activities have different motions in each axis, contemplated tracking systems may allow different tracking modes to be assigned to each axis. Conversely, a contemplated tracking system may provide for automatically or user-selected tracking modes which fix the horizontal and vertical axis tracking styles to each other, the parameters of such modes being defined for a specific two-axis activity.

It should be further understood that the concepts of the present invention apply to any tracking system, which given a set of criteria, uses the particular parameters of the tracking system to optimize the system performance to satisfy the criteria. The exemplary embodiment listed a number of visual criteria. It will be obvious to those reasonably skilled in the art that other criteria associated with the smart tracking of a subject, but not disclosed herein may be similarly achieved with the apparatus and methods disclosed in the present invention, given the proper system parameters. Such criteria and the means for optimizing the tracking system performance to meet the criteria are within the scope of the present invention.

Accordingly, it will be appreciated that the detailed disclosure has been presented by way of example only and is not intended to be limiting. Various alternative, modifications and improvements will readily occur to those skilled in the art, and may be practiced without departing from the spirit and scope of the invention. The invention is limited only as required by the following claims and equivalents thereto.

What is claimed is:

1. A system permitting a device to point at and track the movements of a moving subject, comprising:
   a. a signal source generating signals which can be tracked;
   b. a control device receiving signals from the source and generating relative orientation data therefrom in the form of control signals, said orientation data varying as continuous functions with changes in the relative angular position of the subject;
   c. memory storing plural sets of data values, each of said data value sets representing selected values for processing said control signals in anticipation of future relative motion of the subject based on past motion of the subject;
   d. a selector selecting one of said sets of data values;
   e. a processor processing said control signals in accordance with the one of said sets of data values selected by said selector to produce processed control signals; and
   f. a drive unit moving the device about at least one axis in response to said processed control signals to maintain the device pointed at the subject.

2. The system of claim 1 wherein each of said data value sets comprises data values representing selected acceleration rates of the device and selected deceleration rates of the device, for a particular range of anticipated motion by the subject.

3. The system of claim 1 where each of said data value sets comprises data values representing a selected angular velocity of the device, and a maximum allowable angular error between the axis of the device and the subject, for a particular range of anticipated motion by the subject.

4. The system of any of claims 1, 2 or 3 wherein said selector comprises a user-defined signal for indicating which of said plural sets of data values is to be selected.

5. The system of any of claims 1, 2, or 3 wherein said selector comprises circuitry automatically selecting one of said plural sets of data values in anticipation of future relative motion of the subject based on past motion of the subject.

6. An apparatus intelligently and automatically tracking a moving subject with a camera comprising:
   a. circuitry determining an error direction representing the present orientation of the subject relative to the camera;
   b. a sensor for sensing a last direction in which the camera moved about an axis;
   c. a calculator calculating an elapsed time value representing the elapsed time interval since the camera last moved;
   d. a comparator comparing the last direction with the error direction, and for-comparing the elapsed time value with a predetermined value if the error direction and the last direction are not equal; and
   e. a drive unit, responsive to said circuitry determining an error and said comparator moving the camera in the error direction about said one axis if the elapsed time value at least equals the predetermined value or the last direction equals the error direction.

7. The apparatus of claim 6 wherein said circuitry determining an error direction comprises:
   a controller receiving source signals from the subject and continuously generating therefrom control signals representing the angular error between the position of the subject and the camera along at least one plane.

8. An apparatus permitting a camera to maintain a moving subject within the frame of a camera in a manner which is visually pleasing to a viewer, the apparatus comprising:
   a. a memory storing a plurality of predetermined limits for the angular velocity and angular acceleration of the camera about an axis;
   b. a drive unit, responsive to the memory moving the camera about the axis at rates not in excess of the predetermined limits to maintain the subject within the zone;
   c. a mechanism defining a central zone within the camera frame and substantially symmetrical about the center of the subject;
   d. a first calculator calculating a first percentage representing the total time the subject was outside the central zone during a given time interval;

e. a second calculator calculating the maximum angular velocity and maximum angular acceleration of the subject within the given time interval; and f. circuitry, responsive to said first and said second calculators, selecting new predetermined limits from the memory storing the angular acceleration and angular velocity of the camera in anticipation of future motion of the subject.

9. The apparatus of claim 8 wherein the circuitry selecting new predetermined limits comprises a first comparator comparing the first percentage with a predetermined maximum allowable percentage stored in said memory and selecting new predetermined limits for the angular velocity and the angular acceleration of the camera when the first percentage exceeds the predetermined maximum allowable percentage.

10. The apparatus of claim 9 wherein said circuitry selecting new predetermined limits comprises a second comparator comparing the maximum angular velocity and maximum angular acceleration of the subject with the current predetermined limits for angular velocity and angular acceleration of the camera, and for selecting new predetermined limits for the angular acceleration and angular velocity of the camera when the maximum angular velocity and maximum angular acceleration of the subject are substantially less than or substantially greater than the current predetermined limits.

11. An apparatus for intelligently and automatically tracking a moving subject within the frame of a camera comprising:

a. a mechanism defining a central zone within the camera frame by a pair of angular coordinates along one axis and substantially symmetric about the center of the subject at a first time;

b. circuitry determining an angular error along said one axis between the subject and the camera at a second time;

c. circuitry determining whether the angular error is within the central zone;

d. circuitry determining an error direction representing the direction in which the camera must move to reduce the angular error at the second time, if the angular error is not within the central zone;

e. a drive unit moving the camera about said one axis in the error direction; and f. circuitry redefining the angular coordinates of the central zone so that the central zone is shifted in a direction which is opposite the error direction.

12. The apparatus of claim 11 wherein said redefining circuitry comprises:

a first subtractor subtracting the value of one of the angular coordinates defining the central zone from the value of the angular error to form a difference value; and a second subtractor subtracting the difference value from each of the angular coordinates to form new angular coordinates.

13. An apparatus for intelligently and automatically tracking a moving subject within the frame of a camera comprising:

a. a receiver receiving signals from the subject and generating relative orientation data therefrom in the form of control signals, said orientation data being a continuous function of the relative angular position of the subject;

b. a mechanism defining a central zone within the camera frame with a pair of angular coordinates along one axis;

c. circuitry determining, from the control signals, whether the subject is within the central zone;

d. a processor processing the control signals if the subject is not within the central zone;

e. circuitry redefining the angular coordinates describing the central zone to reorient the central zone within the camera frame; and f. a drive unit, responsive to the processor, moving the camera about an axis to maintain the subject within the central zone.

14. An apparatus for permitting a camera to maintain a moving subject within the camera frame in a manner that is visually pleasing to a viewer, the system comprising:

a. a subject generating signals which can be tracked;

b. a controller receiving signals from the subject and continuously generating relative orientation data therefrom in the form of control signals, said control signals representing the angular error between the position of the subject and the camera along at least one plane;

c. a mechanism anticipating future relative motion of the subject based on past motion of the subject;

d. a processor responsive to said control signals, for determining whether the angular error represented by the control signals is within an acceptable range given anticipated motion by the subject, and processing said control signals if said angular error is not within the acceptable range; and e. a drive unit, responsive to said processed control signals, selectively moving the camera about an axis to maintain the subject within the camera frame.

15. An apparatus for tracking the motion of a subject comprising:

a. a memory storing a plurality of predetermined limits for each of the angular acceleration and angular velocity of the apparatus about an axis;

b. a controller storing periodic values for each of the angular speed and angular acceleration of the subject during a given time interval and determining the motion characteristics of the subject during the given time interval from said periodic values;

c. a selector, responsive to the controller, selecting one of said plurality of predetermined limits for each of the angular acceleration and angular velocity of the apparatus in accordance with the motion characteristics of the subject; and d. a drive unit, responsive to the selector and the memory, moving the apparatus about the axis at rates not in excess of the selected predetermined limits.

16. The apparatus of claim 15 wherein the selector further comprises a user-defined signal for indicating which of the predetermined limits in the memory are to be selected.

17. The apparatus of claim 15 wherein the selector comprises circuitry automatically selecting said predetermined limits in anticipation of future relative motion of the subject based on the motion characteristics of the subject.

18. The apparatus of claim 15 wherein the motion characteristics of the subject comprise the average angular speed and maximum angular speed of the subject during the given time interval.

19. The apparatus of claim 18 wherein the motion characteristics of the subject further comprise the average angular acceleration and maximum angular acceleration of the subject during the given time interval.

20. The apparatus of claim 19 wherein said selector comprises a first comparator comparing the maximum angular speed and maximum angular acceleration of the subject with the current predetermined limits for angular velocity and angular acceleration of the apparatus, and selecting new predetermined limits for the angular acceleration and angular velocity of the apparatus when the maximum angular speed and maximum angular acceleration of the subject are substantially less than the current predetermined limits.

21. The apparatus of claim 19 wherein said selector comprises a second comparator comparing the maximum angular speed and maximum angular acceleration of the subject with the current predetermined limits for angular velocity and angular acceleration of the apparatus, and selecting new predetermined limits for the angular acceleration and angular velocity of the apparatus when the maximum angular speed and maximum angular acceleration of the subject are substantially greater than the current predetermined limits.

22. The apparatus of claim 15 wherein the motion characteristics of the subject comprise the average displacement and maximum displacement of the subject during the given time interval.

23. The apparatus of claim 15 wherein the motion characteristics of the subject comprise a first time value representing the average elapsed time between direction reversals by the subject during the given time interval.

24. The apparatus of claim 23 wherein the memory further stores a plurality of predetermined limits for a second time value representing the minimum allowable elapsed time between direction reversals by the apparatus about the axis; and said drive unit further comprises circuitry reversing the direction of the apparatus about the axis once the second time value is at least equaled.

25. The apparatus of claim 24 wherein the means for selecting comprises a third comparator comparing the first time value with the current predetermined limit for the second time value, and selecting a new predetermined limit for the second time value when the first time value is greater than the current predetermined limit for the second time value.

* * * * *